United States Patent
Wettergard et al.

(10) Patent No.: US 6,817,348 B2
(45) Date of Patent: Nov. 16, 2004

(54) DEVICE FOR HUMIDIFYING THE INTAKE AIR OF AN INTERNAL COMBUSTION ENGINE, WHICH IS EQUIPPED WITH A TURBOCHARGER, INVOLVING PREHEATING EFFECTED BY A WATER CIRCUIT

(75) Inventors: Jan Wettergard, Kungsängen (SE); Siegfried Bulang, Kerkrade (NL)

(73) Assignee: Munters Euroform GmbH, Aachen (DE)

( * ) Notice: Subject to any disclaimer, the term of this patent is extended or adjusted under 35 U.S.C. 154(b) by 0 days.

(21) Appl. No.: 10/472,454
(22) PCT Filed: Mar. 19, 2002
(86) PCT No.: PCT/DE02/00986
§ 371 (c)(1), (2), (4) Date: Mar. 16, 2004
(87) PCT Pub. No.: WO02/075141
PCT Pub. Date: Sep. 26, 2002

(65) Prior Publication Data
US 2004/0149240 A1 Aug. 5, 2004

(30) Foreign Application Priority Data
Mar. 20, 2001 (DE) .......................................... 101 13 416

(51) Int. Cl.$^7$ .............................................. F02B 33/00
(52) U.S. Cl. ..................................... 123/559.1; 60/598
(58) Field of Search .............................. 123/559.1, 560, 123/561, 564, 184.21; 60/598, 597, 599, 604

(56) References Cited

U.S. PATENT DOCUMENTS 4,122,679 A * 10/1978 Charron ........................ 60/599
6,543,659 B2 * 4/2003 Blair ........................... 224/404

* cited by examiner

Primary Examiner—Bibhu Mohanty
(74) Attorney, Agent, or Firm—Herbert Dubno

(57) ABSTRACT

The invention relates to a device for humidifying the intake air of internal combustion engines that are equipped with a turbocharger. The device comprises a humidifying unit (14, 16) through which the intake air and humidifying liquid flow and come into contact with one another. The humidifying unit is arranged upstream from the compressor (6) of the turbocharger in the direction of flow of the intake air. A heat exchanger (13, 15), which serves to pre-heat the intake air and through which the atmospheric intake air flows, is located upstream from the humidifying unit in the flow path of the intake air. Said heat exchanger is connected to a liquid circuit (11, 21) with which the humidified intake air that is compressed by the compressor and supplied to the internal combustion engine is cooled by another heat exchanger (9).

15 Claims, 2 Drawing Sheets

Figure 1:
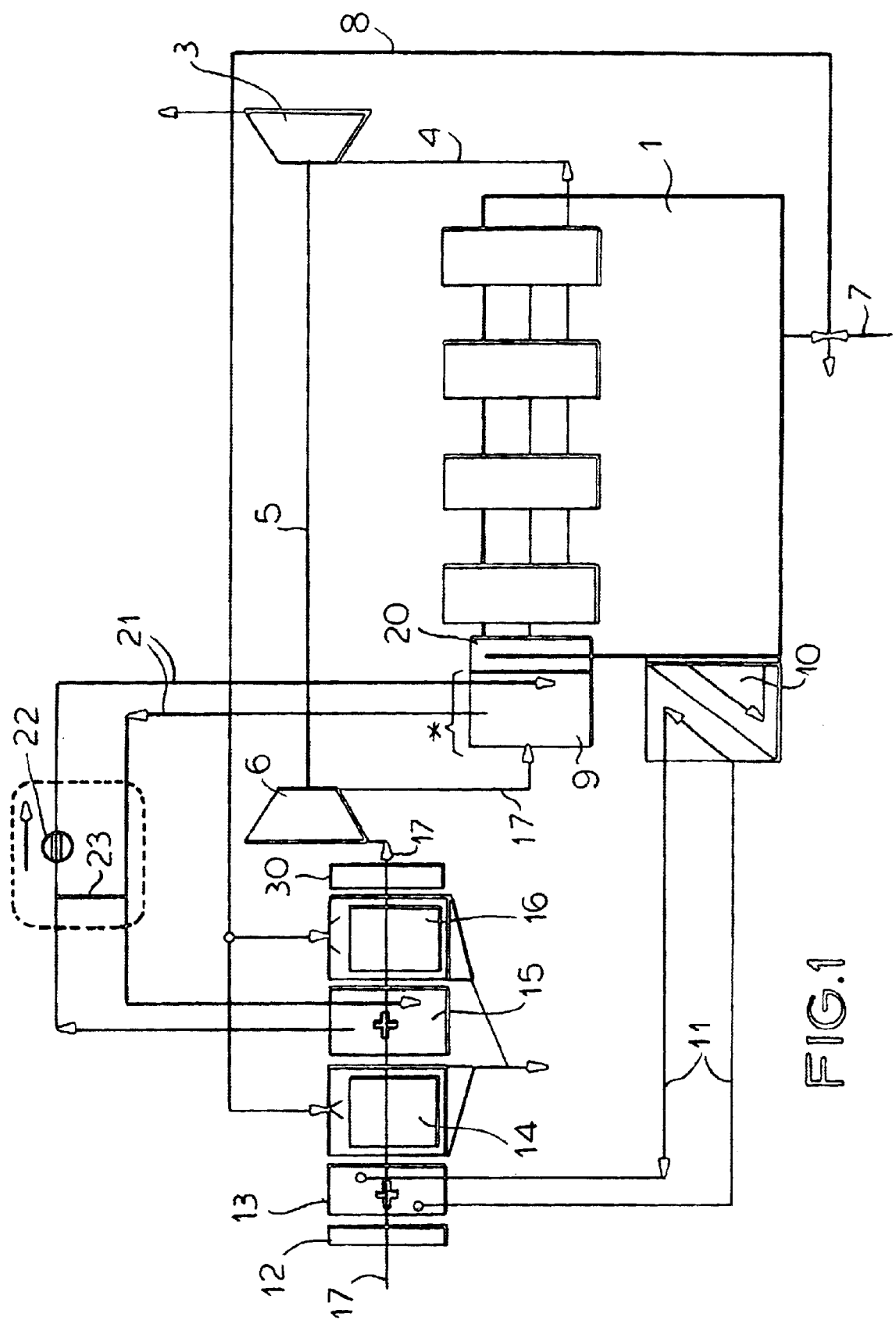

DEVICE FOR HUMIDIFYING THE INTAKE AIR OF AN INTERNAL COMBUSTION ENGINE, WHICH IS EQUIPPED WITH A TURBOCHARGER, INVOLVING PRE-HEATING EFFECTED BY A WATER CIRCUIT

The present invention is directed to a device for humidifying the intake air of an internal combustion engine, which is equipped with a turbocharger.

It is known to humidify the intake air of Diesel engines, which are equipped with turbochargers, in order to reduce the NOx portion in the exhaust gas in this manner. Such a method with associated device is described in WO 95/23 286. According to this publication a humidifying means is used which is passed by the intake air and water, wherein the intake air, prior to the humidification, is compressed by the compressor of the turbocharger and the energy residing in the cooling water or the exhaust gases of the internal combustion engine is used for pre-heating the water before the same is introduced into the humidifying means. Accordingly, compressed air is humidified.

From EP 1 076 169 A2 a device for humidifying the intake air of internal combustion engines, which are equipped with a turbocharger, is known which comprises a humidifying means through which the intake air and humidifying liquid flow and contact with one another and which is located upstream from the compressor of the turbocharger in flow direction of the intake air, and an air/air heat exchanger located upstream from the humidifying means in the flow path of the intake air and serving for pre-heating the intake air, said air/air heat exchanger being passed by the atmospheric intake air and the humidified and compressed intake air from the compressor. Accordingly, due to this solution the intake air is humidified in a non-compressed condition. The pre-heating of the intake air is realized by means of an air/air heat exchanger which is passed by the compressed intake air.

It is the object of the invention to provide a device of the indicated kind with which the intake air can be pre-heated in an especially effective and practical manner for humidification.

According to the invention this object is obtained with a device of the cited kind by the feature that the device includes a heat exchanger, serving for pre-heating the intake air, which is flown through by the atmosperic intake air and which is located in a liquid circuit (water circuit) with which the humidified intake air compressed by the compressor, which is fed to the internal combustion engine, is cooled by means of a further heat exchanger.

Accordingly, due to the invention no air/air heat exchanger as with the above-cited prior art is used but instead an air/liquid heat exchanger which is located in a liquid circuit (water circuit) which includes a further heat exchanger. This further heat exchanger is also an air/liquid heat exchanger which is flown through by the compressed and humidified intake air coming from the compressor. In this further heat exchanger the compressed and humidified intake air for the internal combustion engine is cooled, i.e. it delivers a part of its heat energy to the liquid circuit with which this heat energy is transferred to the intake air in the heat exchanger serving for pre-heating the intake air which is pre-heated in this manner for the following humidification.

The liquid circuit is preferably a water circuit.

The inventive solution has a number of advantages. Firstly, means which are already present can be used for carrying out the pre-heating of the intake air for humidification in many cases, especially with internal combustion engines which already have a charging air cooler. In these cases the charging air cooler which is already present can be redesigned in order to serve as further heat exchanger in the liquid circuit for the invention. Even if such a charging air cooler is not used, instead of the same the further heat exchanger can be disposed so that the space necessary for the inventive solution is reduced. Secondly, further means, as for instance exhaust gas heat exchangers, oil heat exchangers (oil coolers), can be incorporated into the liquid circuit if the operation conditions of the internal combustion engine make this desirable.

Accordingly, the further heat exchanger in the liquid circuit is a charging air cooler (intercooler), especially a charging air cooler which is already present and which is redesigned correspondingly. So, preferably the existing charging air cooler of the internal combustion engine of a ship is used as further heat exchanger wherein the sea water circuit of the charging air cooler is used as liquid circuit into which the heat exchanger is incorporated (with correspondingly modified sea water circuit).

According to the invention the compressed and humidified intake air coming from the compressor is cooled in the further heat exchanger (charging air cooler). Such a cooling is desired wherein, however, a condensation of the compressed and humidified air has to be avoided. According to the invention this is preferably achieved in such a manner that the liquid circuit includes a bypass valve and a bypass line which enable recirculating of the liquid coming from the heat exchanger to the heat exchanger without flowing through the further heat exchanger. If, for instance, a sensor determines that further cooling of the compressed and humidified intake air would result in a condensation, the bypass valve will be opened and the liquid coming from the heat exchanger will be partly recirculated to the heat exchanger without passing the further heat exchanger. Accordingly, the liquid circuit is partly short-circuited which has the result that the humidified and compressed intake air is less cooled in the further heat exchanger (charging air cooler). By closing the bypass valve the liquid circuit can be again operated in its normal operation cycle. Accordingly, the cooling of the humidified and compressed intake air can be regulated with the bypass valve.

The inventive solution is characterized by an especially simple design since it is relatively uncomplicated to install two different but on principle identical heat exchangers in a spaced condition and to connect the same by means of a liquid circuit (water circuit). For this, only a liquid tube system with a pump is necessary.

Preferably, a droplet separator is located behind the further heat exchanger.

The remaining components of the device for humidifying the intake air of the internal combustion engine can be substantially designed in such a manner as described in the above-cited EP 1 076 169 A2. So, especially upstream from the mentioned heat exchanger located in the liquid circuit further humidifying stages with upstreamly disposed air heating means can be provided. The air heating means can be heat exchangers which are, for instance, flown through by the cooling water of the internal combustion engine. Details of these further components are no more mentioned here. It is rather pointed to the disclosure of EP 1 076 169 A2.

In the following the invention is described in detail by means of two examples in connection with the drawing. Of the drawing FIG. 1 shows a schematic representation of a first embodiment of a humidifying device with Diesel engine; and FIG. 2 shows a schematic representation of a further embodiment of a humidifying device with Diesel engine.

Figure 2:
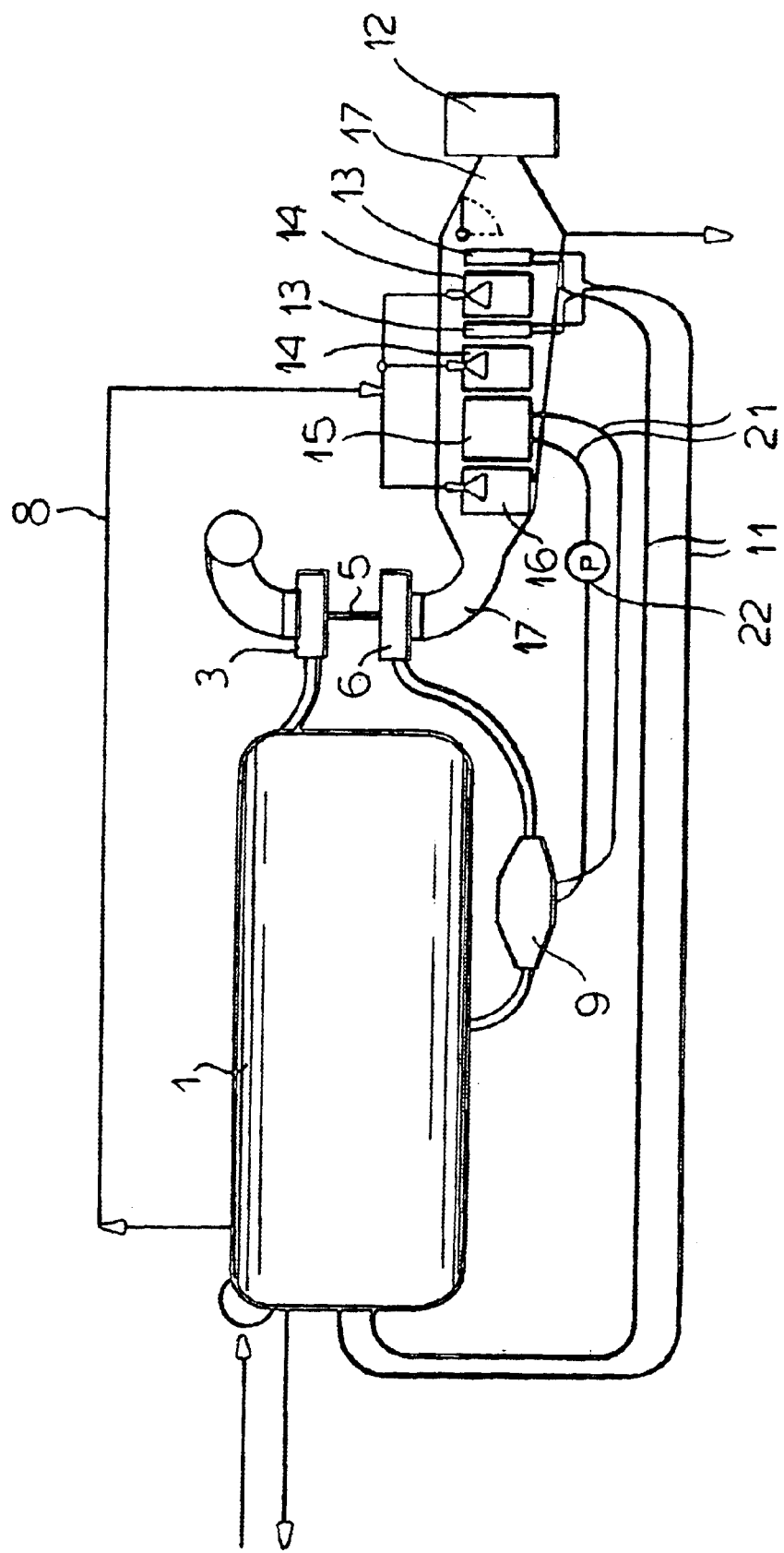

The Diesel engine 1 shown in FIG. 1 is a ship engine having four cylinders 2. The exhaust gas of the engine 1 is discharged at 4 and drives a turbine 3 which forms a part of a turbocharger. Furthermore, the turbocharger comprises a compressor 6 which is driven by the turbine 3 by means of a shaft 5. The compressor 6 serves for compressing the intake air of the Diesel engine which is fed to the respective cylinders 2 through a flow path shown at 17.

Atmospheric intake air flows along the flow path 17 through an air filter 12 to the compressor 6. In the flow path of the intake air the following components are located in this order from the air filter 12 to the compressor 6: an air/water heat exchanger 13, a second humidifying means 14, an air/water heat exchanger 15, a first humidifying means 16 and a droplet separator 30. The intake air flows through the air/water heat exchanger 13 and is pre-heated in the same. In the following humidifying means 14 the pre-heated air is humidified whereby it is cooled. In the following air/water heat exchanger 15 the air is once again heated and in the following humidifying means 16 additionally humidified before it enters the compressor 6 after having passed the droplet separator 30.

The compressed and humidified air discharged by the compressor 6 flows through the flow path 17 into a further air/water heat exchanger 9 which is formed as modified charging air cooler. It flows through the heat exchanger 9 and is cooled by the same without condensing. After having passed another droplet separator 20 it is fed to the cylinders 2 of the Diesel engine 1.

The ship motor shown here has a sea water circuit (salt water circuit) 7 serving for cooling the engine. From this circuit 7 salt water is branched off through a branch line 8, and the salt water is fed to the two humidifying means 14 and 16. The humidifying means are formed as surface irrigation humidifiers (dripping humidifiers) which are flown through from above to below by salt water wherein the salt water is sprayed over appropriate surface irrigation humidifying means onto a packed bed. The surface irrigation humidifier is flown through by the intake air in cross direction wherein the intake air takes up moisture in an adiabatic manner.

Downstream from the humidifying means a device for separating entrained salt particles can be located in order to prevent the entraining of salt particles into the cylinders of the internal combustion engine.

A water/water heat exchanger 10 is located in the cooling water circuit of the Diesel engine. This heat exchanger 10 serves for the transfer of the heat energy residing in the cooling water to a water circuit 11. This water circuit 11 contains the above-mentioned air/water heat exchanger 13 for pre-heating of the intake air. The heated water flowing through th e circuit 11 flows through the tube coils of the heat exchanger 13 and heats the intake air flowing around the tube coils.

The exhaust gas of the Diesel engine can also serve for pre-heating of the intake air. The heat exchanger 13 can also be an air/air heat exchanger.

The heat exchanger 13 and the following humidifying means 14 are optional. Substantial components of the device are the heat exchanger 15 and the humidifying means 16. The heat exchanger 15 is an air/water heat exchanger which has a tube coil flown through by water. This water is circulated by a pump 22 in a water circuit 21 in which the above-mentioned heat exchanger 9 (modified charging air cooler) is located. This heat exchanger 9 has a tube coil flown through by the water of the water circuit 21 either. The tube coil is flown around by the compressed and humidified in take air.

A bypass line 23 provided with a bypass valve (not shown) connects the supply line and the discharge line. If the bypass valve is opened the water coming from the heat exchanger 15 flows through the bypass line 23 to the discharge line of the water circuit and from there back into the heat exchanger 15. Accordingly, it does not flow through the heat exchanger 9. In this manner it is avoided that the air flowing through the heat exchanger 9 is further cooled (avoiding condensation). By closing the bypass valve the water circuit can take up its normal operation a gain.

In the embodiment shown here the heat exchanger 9 is a modified charging air cooler (intercooler) with droplet separator 20 located thereafter. The original sea water cooling of this charging air cooler is closed, and the installed water circuit is used here as part of the water circuit 21, possibly with another internal circuit component. In this manner one can use existing means which can be utilized for the purposes of the invention with small expense.

FIG. 2 shows another embodiment of a humidifying device with Diesel engine which differs from the embodiment of FIG. 1 substantially only by the feature that two stages are located u ps t ream from the humidifying device 15 which, respectively, contain a humidifying means 14 and a prelocated heat exchanger 13. The same reference numbers designate the same parts as in FIG. 1. Intake air for the Diesel engine 1 flows along a flow path 17 through an air filter 12 and through an air/water heat exchanger 13 and a humidifying device 14 located thereafter. It flows then through another air/water heat exchanger 13 and another humidifying means 14 to the air/water heat exchanger 15 which is located in the water circuit 21 which has another heat exchanger 9 being a modified charging air cooler (intercooler) as with the embodiment of FIG. 1. After having passed the heat exchanger 15 the intake air flows to the humidifying means 16. It is then pre-heated and humidified and is compressed in the compressor 6 from which it is fed to the further heat exchanger 9 in which it is cooled. Then it flows to the internal combustion engine 1 in a cooled condition.

In the water circuit 21 water is circulated by means of a pump which is not shown. This water takes up heat in the heat exchanger 9 from the air fed to the internal combustion engine and transfers this heat in the heat exchanger 15 to the intake air which is to be pre-heated.

It has to be still mentioned that the heat exchanger 15 and the humidifying means 16 generally can be divided into several independent stages either. This is also true for the optionally located heat exchangers and humidifying means.

What is claimed is:

1. A device for humidifying the intake air of internal combustion engines, which are equipped with a turbocharger, said device comprising a humidifying means (16) through which the intake air and the humidifying liquid flow and contact with one another and which is located upstream from the compressor (6) of the turbocharger in flow direction of the intake air, and a heat exchanger (15) serving for pre-heating the intake air and located upstream from the humidifying means (16) in flow direction of the intake air, said heat exchanger (15) being flown through by the atmospheric intake air and being located in a liquid circuit (21) by means of which the humidified intake air compressed by the compressor (6) and fed to the internal combustion engine (1) is cooled by means of a further heat exchanger (9).

2. The device according to claim 1, characterized in that the further heat exchanger (9) is a charging air cooler (intercooler).

3. The device according to claim 1 characterized in that a droplet separator (20) is located downstream from the further heat exchanger (9).

4. The device according to claim 1, characterized in that the heat exchanger (9) is an existing charging air cooler (intercooler) of an internal combustion engine of a ship whose sea water circuit is used as water circuit (21) in which the heat exchanger (15) is located.

5. The device according to claim 1, characterized in that the water circuit (21) includes a bypass valve and a bypass line (23) which enable a recirculation of the water coming from the heat exchanger (15) to the same without passing the further heat exchanger (9).

6. The device according to claim 1, characterized in that another humidifying means (14) is located upstream from the heat exchanger (15) in flow direction of the intake air, said another humidifying means (14) having prelocated a heating device for the intake air.

7. The device according to claim 1, characterized in that another heating means is located downstream from the humidifying means (16) and upstream from the compressor (6) in flow direction of the intake air, said another humidifying means having prelocated a heating device for the intake air.

8. The device according to claim 6 characterized in that the heating device is an air/water heat exchanger (13) for discharging the heat energy of the cooling water of the internal combustion engine (1).

9. The device according to claim 1, characterized in that a third humidifying means is located in the flow path of the compressed and humidified intake air between the heat exchanger (15) and the internal combustion engine (1).

10. The device according to claim 9, characterized in that the third humidifying means is associated with a heat exchanger for heating the humidifying agent.

11. The device according to claim 1, characterized in that an air filter is located downstream from the humidifying means in the flow path of the intake air.

12. The device according to claim 1, characterized in that the internal combustion engine (1) has a heat exchanger (10) for cooling the cooling water.

13. The device according to claim 12, characterized in that the heat exchanger is part of a sea water circuit (salt water circuit).

14. The device according to claim 1, characterized in that the further heat exchanger (9) is controlled in response to the pressure of the turbochanger.

15. The device according to claim 1, characterized in that it includes a particle seperator.

* * * * *